Inventor
Glenway Maxon Jr.
By Ira Milton Jones
Attorney

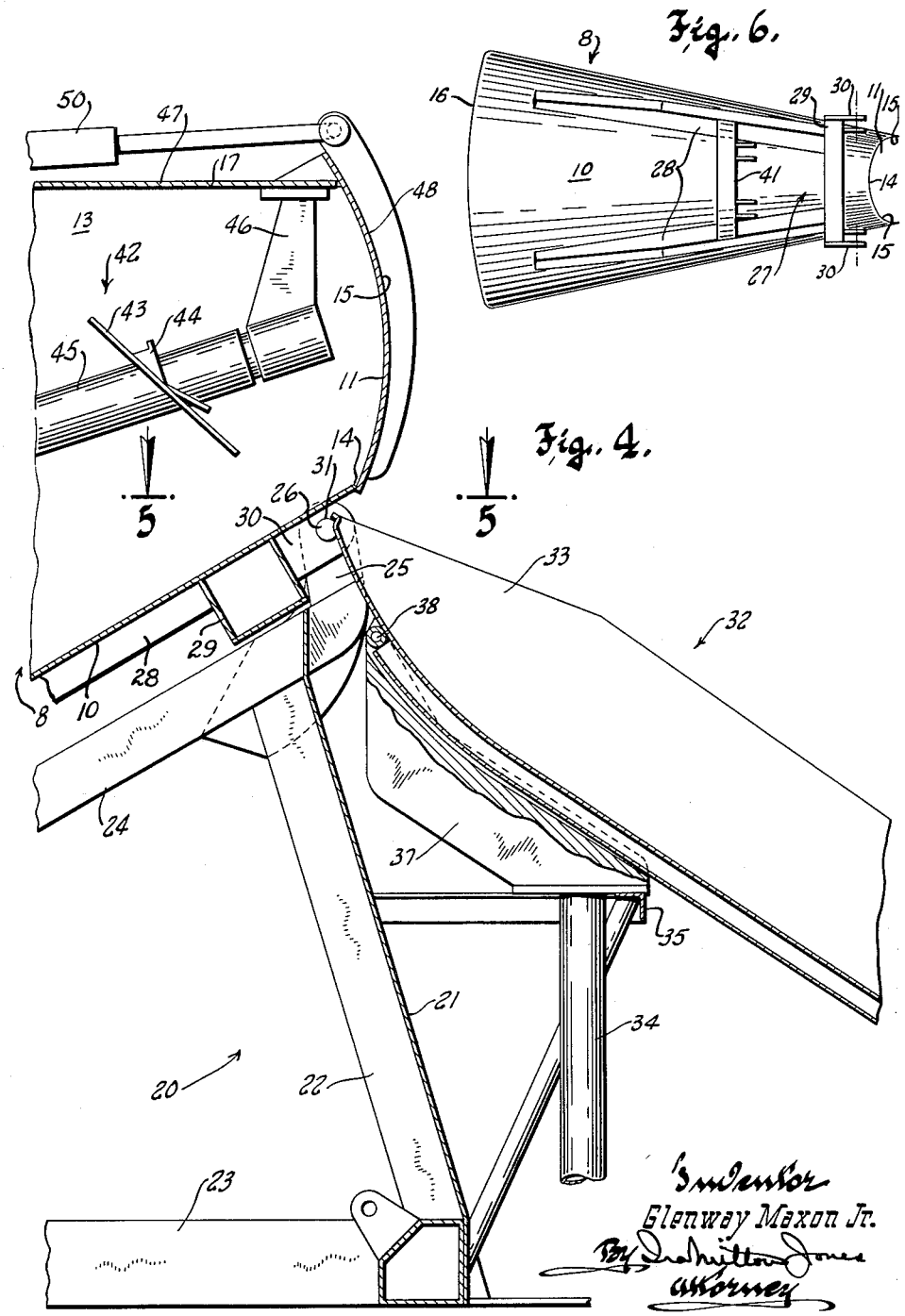

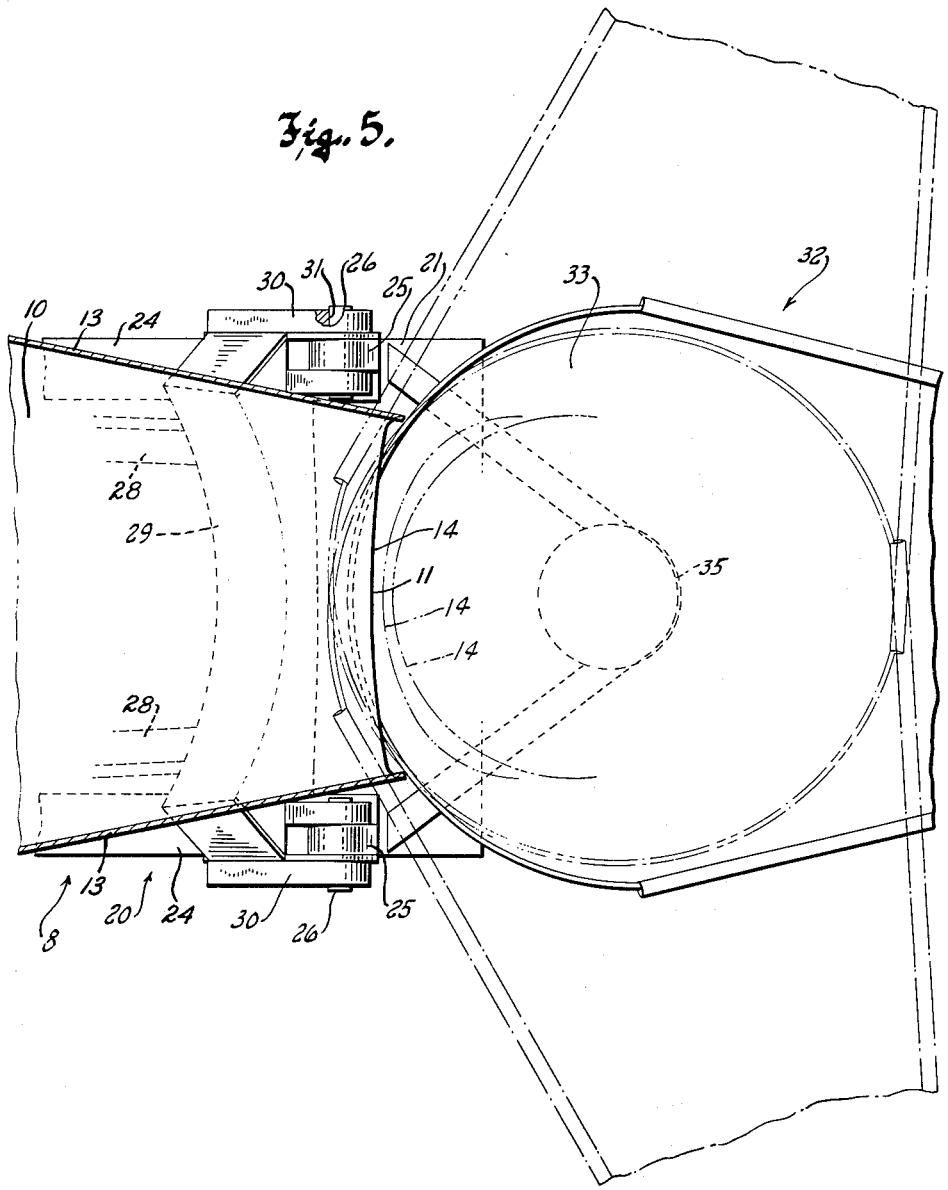

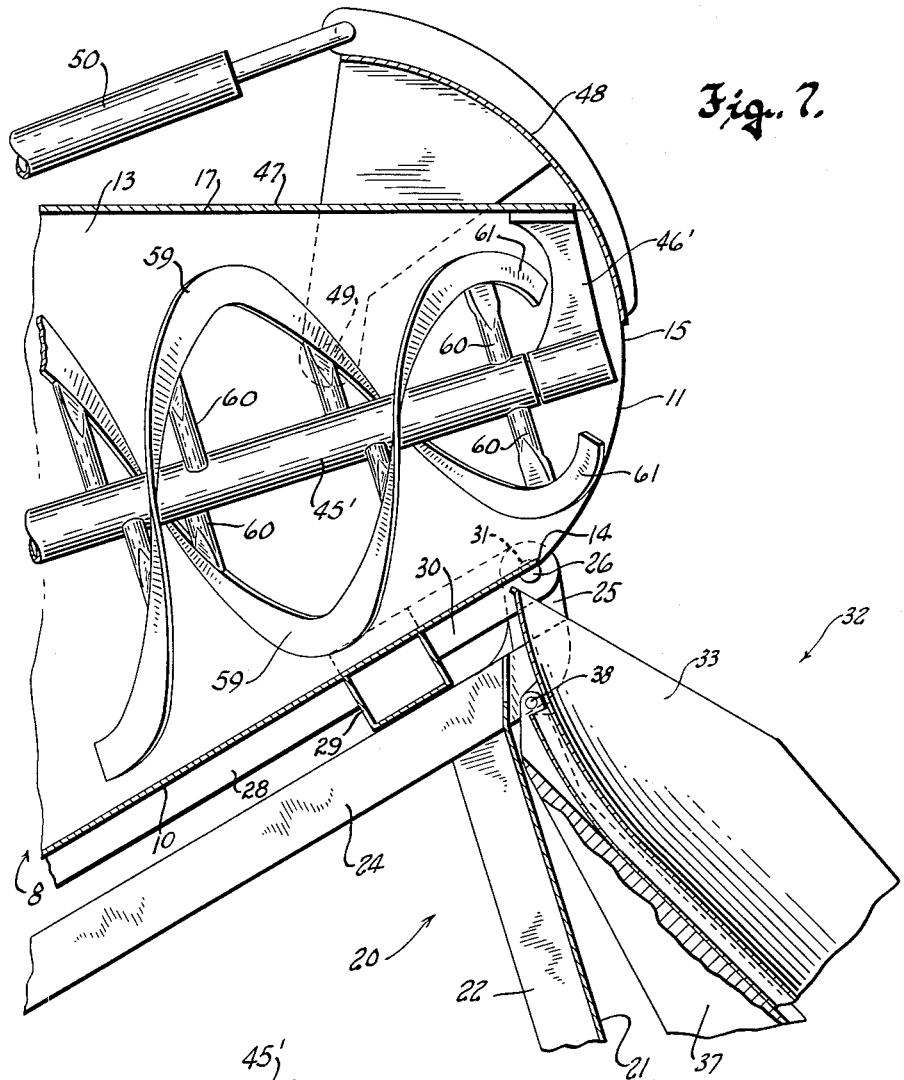
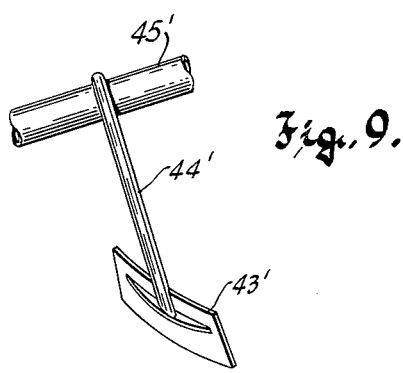

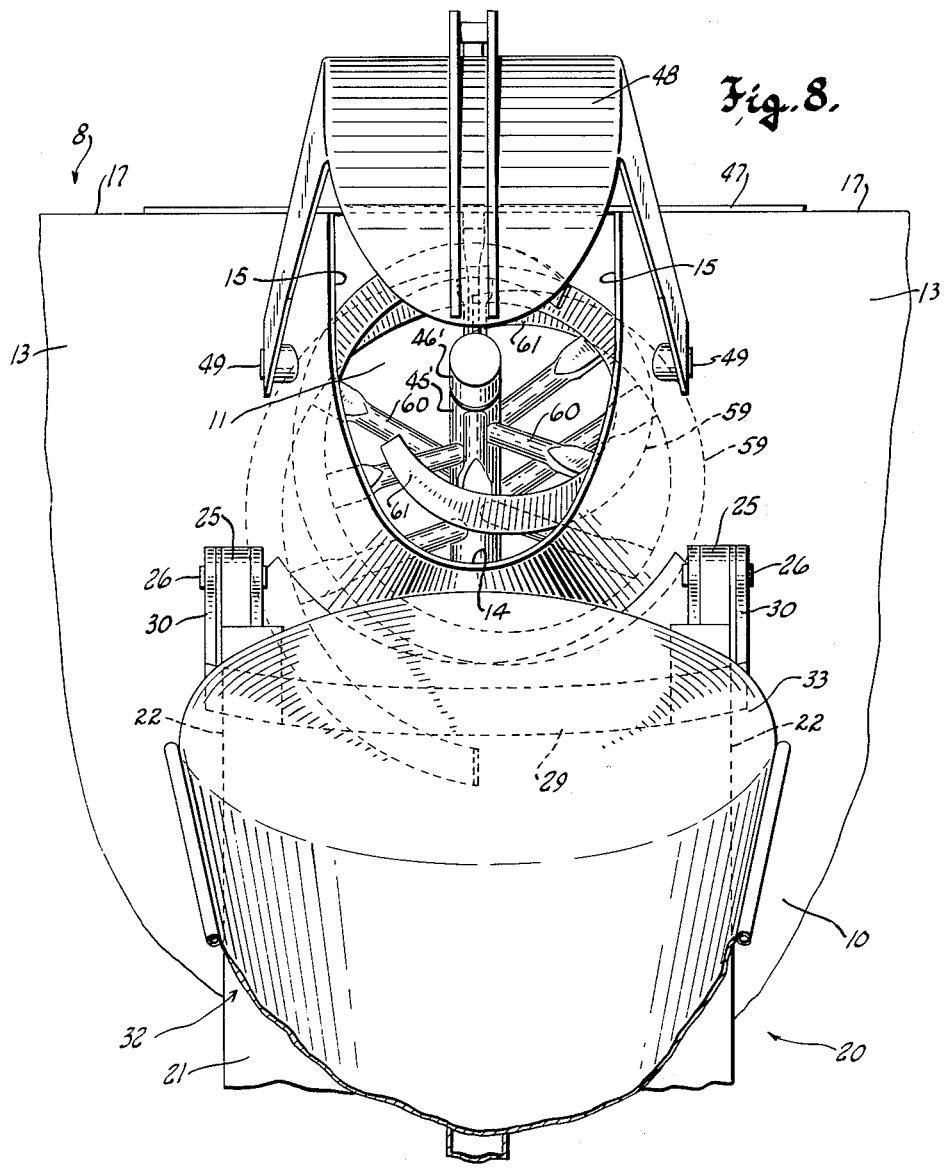

3,198,495
TILTING DUMP TRUCK WITH RECEPTACLE DIS-
CHARGING MEANS AND DIRECTIONAL CHUTE
Glenway Maxon, Jr., 1744 N. Farwell Ave.,
Milwaukee, Wis.
Filed Jan. 23, 1962, Ser. No. 168,109
5 Claims. (Cl. 259—171)

This invention relates to dump trucks and has more particular reference to improvements in dump trucks of the type having a tiltably mounted rear discharge body with an open top, such as disclosed in my Patent No. 2,880,977, issued on April 7, 1959.

Dump trucks of this nature have proved to be highly efficient for transporting freshly mixed concrete from a central mixing plant to a point of use. They feature a body having a discharge opening at its upper rear portion, a rounded and conically surfaced bottom that converges upwardly and rearwardly to the discharge opening and defines the edge thereof over which concrete in the body passes as it flows out through the discharge opening, and opposite side walls joined by the conically surfaced bottom wall and which likewise converge rearwardly to the discharge opening.

A desirable feature of this type of dump truck is that its body is supported for tilting discharge motion about a substantially high axis, extending transversely across the underside of the body near its rear end. This enables the concrete to be discharged into a distributing chute mounted on the rear of the truck for side to side swinging motion and for up and down tilting motion, so that the concrete can be spouted over a relatively great area on a road bed or other site at which the concrete is to be placed.

In the type of dump truck described, the body is reinforced by a rigid keel structure that is secured to the underside of the body, and which comprises a pair of elongated beams extending lengthwise forwardly along the bottom wall of the body from its rear extremity, in transversely spaced relation to one another. A pivot pin passing transversely through the rear end portions of the keel beams and through suitable bearing holes in the upright rear portion of a supporting frame on the rear of the truck chassis, serves to mount the body for tilting discharge motion. This upright supporting frame also carries a vertical bearing which supports the distributing chute for swinging motion around the rear of the truck from one side thereof to the other.

Heretofore, it was necessary to mount the distributing chute with the receiving pan on its upper end considerably lower than the tilt axis at the rear of the body and, in fact, rearwardly of the upright supporting frame and beneath the rear ends of the keel beams so that the pan would clear the same all positions of the chute. For this reason, it was also necessary to have the bottom wall of the body extend rearwardly a distance beyond the tilt axis in order to assure flow of concrete from the discharge opening into the receiving pan on the upper end of the chute.

This placement of the distributing chute was objectionable for two reasons. First, since it located the receiving pan on the chute a substantial distance beneath the lower edge of the discharge opening in the rear of the body, concrete flowing out of the opening during initial discharge of the body contents tended to splash out of the pan, and fall into the space beneath the body, and ahead of the upright portion of the supporting frame, thus invading the space occupied by the body tilt cylinders. At times when the chute was swung to one side or the other, some of the concrete initially flowing out of the rear of the body was apt to miss the receiving pan on the chute, and fall to the ground where it was frequently wasted.

The second disadvantage of the described placement of the chute was that its useful range of up and down tilting motion was seriously limited, primarily by the necessity of mounting the chute with its pan under the rear portions of the keel beams.

Accordingly, it is an object of this invention to provide a dump truck of the character described wherein the aforementioned objections are overcome.

More specifically, it is a purpose of this invention to provide a dump truck of the character described featuring an improved keel structure for reinforcing the bottom of the truck body, and which not only enables the receiving pan on the distributing chute to be located in the most advantageous concrete collecting position with respect to the discharge opening in the rear of the body in any tilted discharging position of the body and in any position to which the chute may be swung about its vertical axis, but also enables the tilt axis for the body to be located closer to the bottom edge of the discharge opening over which concrete passes as it discharges through the opening and higher than was hitherto possible.

In this respect, it is a further and more specific object of this invention to provide a dump truck of the character described wherein widely spaced bearing members on the keel and on the rear of the truck cooperate to define outboard bearings located outwardly adjacent to the opposite sides of the truck body at its rear, by which the body is mounted for tilting rear discharge about a transverse axis that passes under the rear extremity of the body, directly adjacent to the pouring lip provided by the lower edge of the discharge opening in the rear of the body.

Still another object of the invention resides in the provision of an improved reinforcing keel for the body of a dump truck of the character described, which features a yoke that extends transversely under a portion of the body spaced a distance forwardly of the lower edge of the discharge opening at the rear of the body and provides the rearmost component of the keel, and which yoke has rearwardly extending bearing members rigidly secured to its transverse ends, cooperable with widely spaced and separate pivotal supports on the upright frame structure at the rear of the truck to provide the outboard bearings that support the body for tilting discharge about a transverse axis directly adjacent to the lower edge of the discharge opening in the rear of the body.

A further object of the invention resides in the provision of outboard bearings for tiltably mounting the body of a dump truck of the character described, all portions of which bearings are spaced apart a distance at least as great as the width of the rear end portion of the body, and wherein the receiving pan on the distributing chute at the back of the truck has a rim portion that extends forwardly under the lower edge of the discharge opening in the rear of the body, and is accommodated in the space between the outboard bearings so as to enable the receiving pan to clear the same in any position of the chute and to allow the pan to be located directly adjacent to the underside of the body to preclude objectionable splashing of concrete discharging thereinto from the rear of the body, and to assure that all of the concrete discharging from the body will fall into the receiving pan regardless of the position to which the chute may be swung on its vertical axis.

Another object of the invention resides in the provision of a dump truck that is constructed to overcome the discharge difficulties heretofore encountered when transporting low slump concrete.

Concrete mixtures which have from 1½″ to 0″ slump are generally considered as low slump concrete. These are relatively dry mixtures that have such poor flow characteristics that they will not flow unaided down the distributing chute of a dump truck of the type herein concerned, even though the chute were adjusted to its steepest angle of discharge. In addition, because such low slump concrete tends to choke the discharge opening in the rear of the body, it was almost impossible to achieve any but the slowest discharge rates out of the body. In most cases, an attendant had to pull these dryer types of concrete mixes through the discharge opening and onto the receiving pan with a shovel, while another shovel-wielding attendant aided the passage of the concrete down the chute.

Accordingly, it is a further purpose of this invention to provide a dump truck of the character described wherein the body and distributing chute are so mounted on the rear of the truck as to enable the chute to be set at a steeper discharge angle than was heretofore possible, to facilitate the downward travel of low slump concrete along the length thereof.

In this respect, it is another object of this invention to provide a dump truck of the character described wherein the body is mounted to tilt to discharging positions about an axis located at a higher elevation than was heretofore possible and to have a center of gravity at the lowest possible elevation.

Still another object of the invention resides in the provision of a dump truck of the character described, wherein power driven means in the body positioned in its rear end portion, closely adjacent to the discharge opening, acts upon low slump concrete that tends to choke up the opening to positively move such concrete through the opening to thus greatly facilitate and speed the discharge of the body contents.

In this respect, it is a more specfic purpose of the invention to provide a dump truck which is exceptionally well adapted for handling low slump concrete, wherein the power driven means in the body that facilitates movement of the concrete through the discharge opening in the rear of the body comprises helical blades that extend both forwardly and rearwardly of the lower edge of the discharge opening, so as to act upon the concrete at that zone of the body where clogging tends to take place.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

FIGURE 4 is an enlarged fragmentary longitudinal sectional view through the rear of the body and the distributing chute;

FIGURE 5 is a sectional view taken through FIGURE 4 on the plane of line 5—5;

FIGURE 6 is a bottom view of the body per se, taken on the plane of the line 6—6 in FIGURE 3;

FIGURE 7 is a view similar to FIGURE 4, but illustrating a slightly modified embodiment of the invention;

FIGURE 8 is a rear elevational view of the body seen in FIGURE 7; and

FIGURE 9 is a fragmentary detail view showing one of the discharge paddles used in the body of FIGURES 7 and 8.

Figure 1:
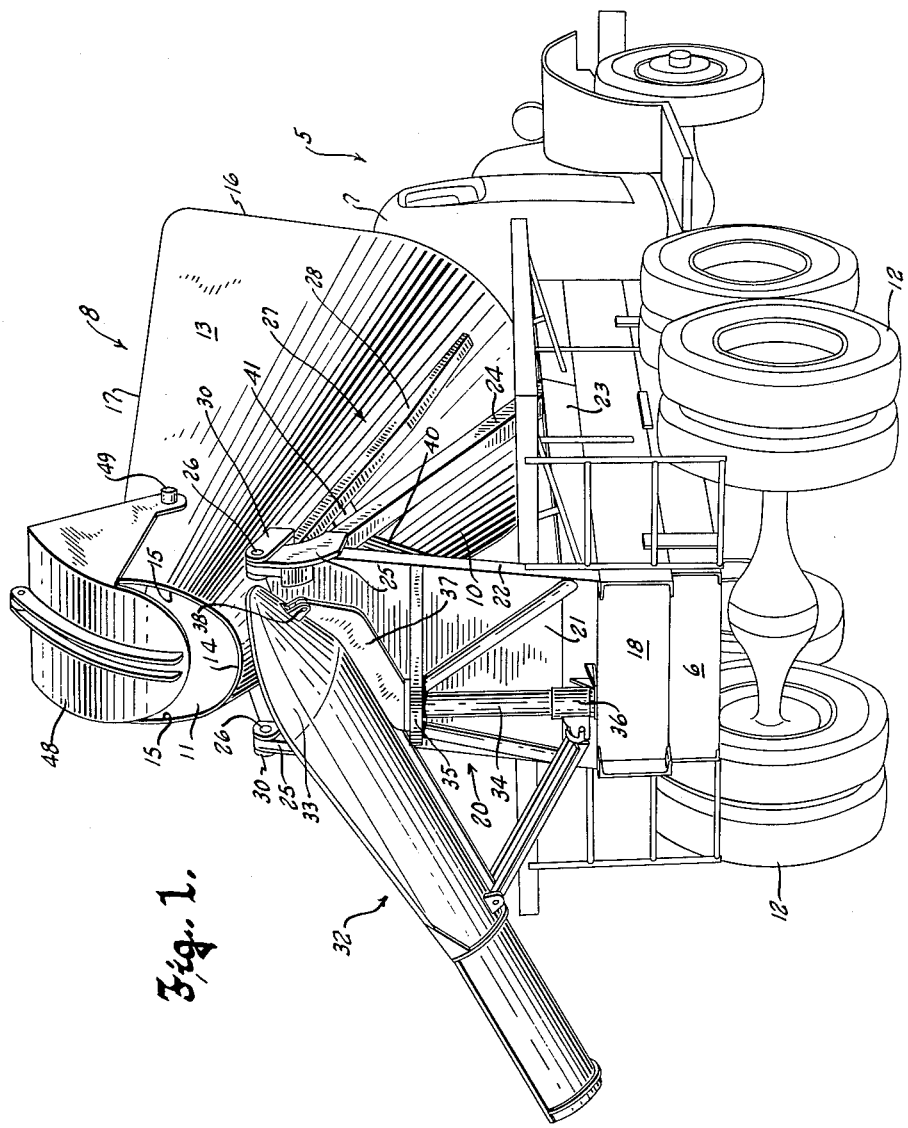
FIGURE 1 is a perspective view of a dump truck embodying this invention, showing the rear and one side of the truck.

Referring now more particularly to the accompanying drawings, in which like reference characters have been applied to like parts throughout the views, the numeral 5 generally designates a truck having a horizontal frame or chassis 6 that extends a substantial distance rearwardly of the cab 7 of the truck so as to provide support for the dump body 8 of this invention.

In general, the construction of the body 8 as well as the means for supporting the same on the rear of the chassis, is generally disclosed in my Patent No. 2,880,977, issued April 7, 1959. The body likewise has substantially the appearance of a truncated cone when viewed from the side, having a rounded or conically surfaced bottom portion 10 which slopes convergently upwardly and rearwardly toward a discharge opening 11 in the upper rear portion of the bottom of the body. The large diameter end portion of the bottom is foremost, and its small diameter end portion is rearmost and projects a short distance beyond the wheels 12 at the rear of the truck.

The upright opposite sides 13 of the body are formed as upward extensions of the rounded bottom portion 10, and similarly to the conically surfaced bottom portion 10 these side walls also converge to the rear of the body. As seen best in FIGURE 1, the rearmost ends of the rounded or conically surfaced bottom portion 10 and of the sides 13 define the bottom and side edges 14 and 15, respectively, of the discharge opening 11.

At its wider and deeper forward portion, the body has a transverse front wall 16 which is normal to the axis of the conically surfaced bottom. The upright front wall 16 thus slopes slightly forwardly from the extreme bottom of the body, and terminates in a plane containing the upper edges 17 of the body side walls. In the transit position of the body seen in FIGURE 2, the upper edges 17 of the side walls lie in a common horizontal plane.

The height of the truck chassis 6 is increased to a substantial extent by superimposing upon it a second horizontal generally rectangular subframe 18, the two frames being secured together in any suitable fashion. The truck body 8 is supported wholly above the subframe 18 by means of a standard or supporting frame 20 which is mounted upon the rear portion of the subframe 18 in the space beneath the upwardly and rearwardly sloping bottom of the body. The standard has a generally upright back 21 that extends across the rear of the subframe substantially directly under the discharge opening 11 in the rear of the body, and which back includes upright posts 22 which rise from each rear corner of the subframe.

Figure 2:
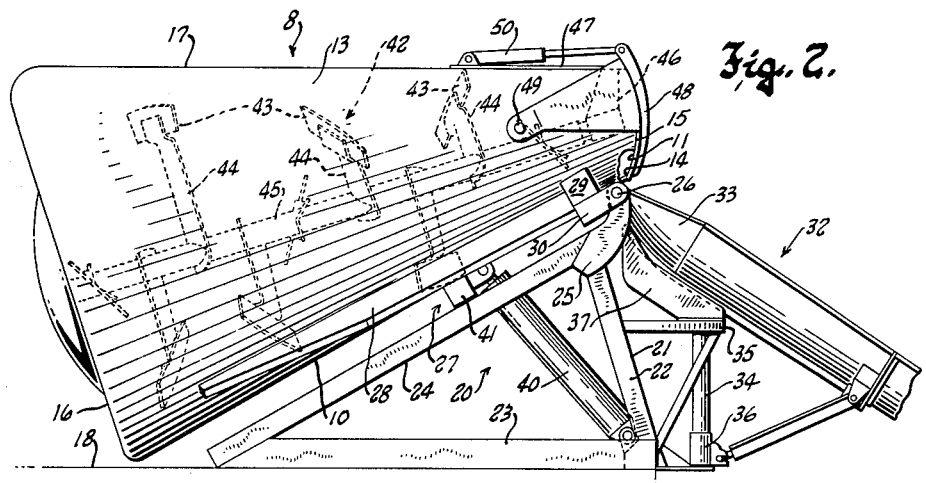
FIGURE 2 is a fragmentary side elevational view of the dump truck shown in FIGURE 1, illustrating the body in a normal or transit position.
Figure 3:
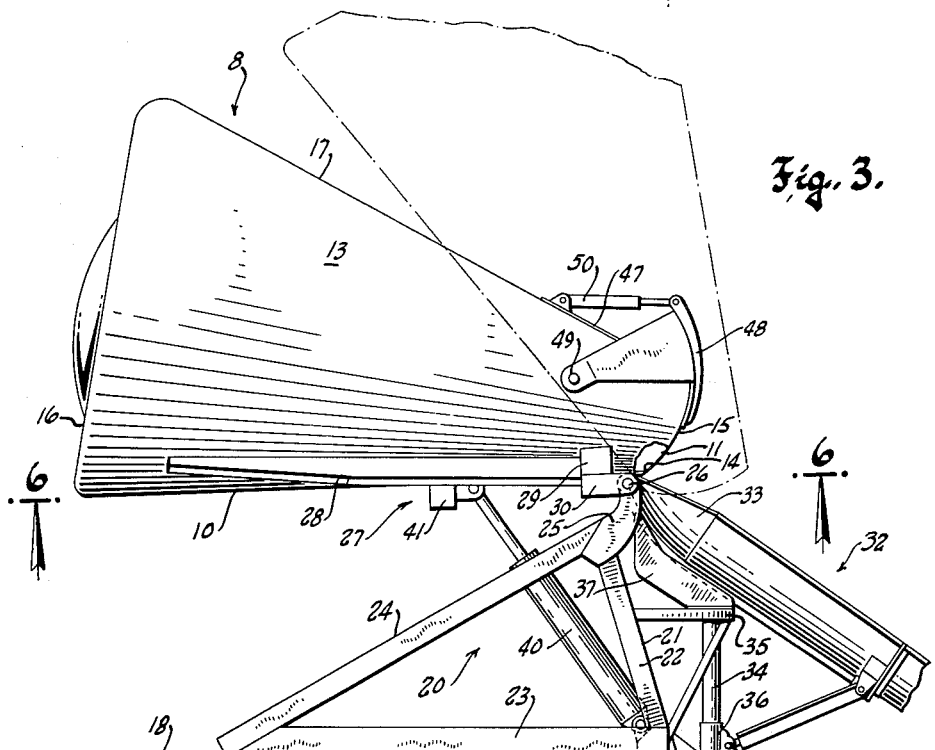
FIGURE 3 is a view similar to FIGURE 2, but showing the body tilted to a plurality of discharging positions.

As seen best in FIGURES 2 and 3, the supporting frame or standard 20 is substantially triangular when viewed from the side. It comprises a base provided by a pair of sills 23 that rest on and are secured to the opposite sides of the subframe 18 and to the bottoms of the posts 22, upwardly and rearwardly inclined diagonal braces 24 which join the tops of the uprights 22 with the forward ends of the sills, and the upright back 21 previously mentioned. Preferably, the upright back of the standard or supporting frame is inclined slightly from vertical, toward the front of the truck.

At its apex, the supporting frame is formed with a pair of separate pivotal supports which are in the nature of arms 25 that are rigidly joined to the upper end portions of the posts 22 and the braces 24. The arms 25 extend upwardly from the apex of the frame toward the rear extremity of the bottom wall 10 of the body, and each carries a pivot pin 26. These pivot pins align on a common transverse axis which passes directly adjacent to the underside of the body and to the bottom edge 14 of the discharge opening 11 in the upper rear of the body.

Attention is directed to the fact that the pivotal supports provided by the arms and their pins 26 are spaced a substantial distance apart and in such relation to the rear of the body that they lie outwardly adjacent to the opposite sides of the body at its rear. Consequently, no portions of the pivotal supports extend under the rear of the body.

Mounted on the upwardly and rearwardly sloping bottom wall 10 of the body to reinforce the same is a rigid keel structure, generally designated 27. The keel is comprised of a pair of elongated beam-like members 28 that extend forwardly along the bottom wall 10, near its junction with the side walls 13, from a yoke 29 that transversely embraces a rear portion of the bottom wall near the discharge opening 11. The yoke, however, is spaced a distance forwardly of the lower edge 14 of the discharge opening, and constitutes the rearmost portion of the keel. At its opposite ends, the yoke has forked bearing members 30 affixed thereto, which project rearwardly to embrace the arms 25 on the standard and to receive the opposite ends of the pivot pins 26 in suitable aligned apertures 31 in the rear ends of the bearing members. Consequently, the bearing members and the pivotal supports 25 cooperate to provide substantially widely spaced outboard bearings by which the body is supported for tilting motion about a transverse axis directly adjacent to its rear extremity and to the underside of the body. Hence, the body tilt axis is located substantially as close as possible to the lower edge 14 of the discharge opening in the upper rear of the body, and at a greater distance above the horizontal framework of the truck chassis than in past constructions.

Persons skilled in the art relating to dump trucks of the type herein concerned have for long realized that it is desirable to effect discharge of concrete or similar materials out of the truck body from the highest possible elevation. The purpose, of course, is to facilitate distribution of the discharging concrete over a wide area by means of a chute, generally designated 32, such as is customarily mounted at the rear of the body for side to side swinging motion around the rear of the truck.

Heretofore, however, the only known way of achieving a higher tilt axis for the body was to mount the body at a higher elevation above the horizontal supporting framework on the truck. This expedient, of course, has the disadvantage that it also raises the center of gravity of the body and is apt to render the truck unstable when the body is carrying a full load of concrete.

In the present instance, however, a higher tilt axis for the body is achieved without increasing the height of the body with respect to the horizontal supporting frame structure beneath the body, and thus without any corresponding elevation of its normal center of gravity. According to this invention, the outboard bearing structure not only makes possible the tilting of the body about a higher axis than could be achieved heretofore, but equally as important, provides for mounting the distributing chute 32 on the rear of the truck with the receiving pan 33 on its upper end in the most strategic position with respect to the discharge opening 11 in the rear of the body. The chute may be mounted on the rear of the truck in a more or less conventional way, as by means of a post 34 rotatably carried by spaced upper and lower bearing members 35 and 36, respectively, on the back 21 of the standard, projecting rearwardly therefrom, and disposing the post with its axis vertical and a short distance behind the rear of the body. A bracket 37 fixed to the top of the post and extending eccentrically to one side of its axis and under the receiving pan 33, serves to support the chute from the post for side to side swinging motion around the rear of the truck. For this purpose, the eccentric upper portion of the bracket 37 has a pivotal connection 38 with the bottom of the receiving pan, which provides for up and down motion of the chute about a horizontal axis remote from the axis of the post and near the rim portion of the receiving pan. When the chute is positioned to extend straight back from the truck, the pivotal connection 38 extends transversely of the rear of the truck, parallel to the body tilt axis, but beneath the tilt axis and almost directly under the rear extremity of the body.

It is important to observe that the chute is so positioned on the rear of the truck that its receiving pan 33 extends under and forwardly beyond the lower edge 14 of the discharge opening in the rear of the body, into the space between the outboard bearings for the body, so that the foremost rim portion of the pan lies very close to the underside of the body. Consequently, all of the concrete discharging from the rear of the body will flow into the receiving pan, without objectionable splashing. The close proximity of the pan to the bottom edge of the discharge opening in the body assures this desirable result. That portion of the receiving pan which is uppermost in any downwardly inclined distributing position of the chute defines a substantially semicircular rim on the chute that is concentric to the axis of the chute pivot 34, and remains in proper position beneath the discharge opening 11 in the body, between its outboard bearings, in any position to which the chute may be swung on its vertical axis.

As will be apparent from FIGURES 4 and 5, because of the curvature of the rim on the receiving pan of the chute and the slope of the latter, the chute can swing from side to side about its pivot axis without interference from the outboard bearings at each side of the rear portion of the body. Such side to side swinging motion of the chute will be limited only by the engagement of side portions of the chute located a distance downstream of its receiving pan with upright portions of the chassis carried upright supporting structure at elevations thereof spaced a substantial distance below the body tilt axis.

With the described relationship between the pouring lip 14 of the discharge opening in the body and the body tilt axis, it will be noted that the pouring lip is not lowered appreciably beneath the tilt axis in any tilted discharging position of the body. As a result, the receiving pan 33 on the upper end of the distributing chute 32 need not be supported at such a distance beneath the rear extremity of the body as to provide for clearance between the rear of the body and the pan as the body is tilted toward its highest discharging position seen in construction lines in FIGURE 3.

Heretofore, however, the overhanging rear portion of the body, behind the tilt axis, was not the only reason that the distributing chute had to have its receiving pan 33 located a substantial distance beneath the discharge opening in the body. Previously, the keel structure on the bottom of the body was usually provided with longitudinal beams that were closely adjacent to one another at the rear of the body, and extended rearwardly substantially to the lower edge of the discharge opening in the body. Consequently, the receiving pan had to be located beneath the rear ends of the keel beams so as to clear the same in all operating positions of the distributing chute. The result was that the concrete pouring out of the discharge opening in the rear of the body during initial discharge of the body contents dropped a considerable distance before it reached the pan of the distributing chute, and much of the discharging concrete splashed upwardly and outwardly over the rim of the receiving pan. Some of the concrete that splashed out of the pan fell to the ground, and some of it invaded the space ahead of the back 21 on the standard 20, where it collected on the hydraulic lift cylinders 40 for the body to objectionably foul the same.

According to this invention, however, the outboard bearings 25–26–30 for the body, being located a substantial distance apart at the rear of the body and outwardly adjacent to the opposite sides of the body, enable the distributing pan 33 on the chute to occupy the space between the outboard bearings and to extend forwardly beneath the lower edge 14 of the discharge opening and under the rear portion of the body, to lie closely adjacent thereto. Consequently, concrete discharging through the opening does not tend to splash as it is received in the pan 33, but flows smoothly down along the chute for distribution upon the roadway or other surface upon which the concrete is to be placed without objectionable waste such as was experienced heretofore.

A substantial portion of the rim of the receiving pan 33 is always in position directly beneath the discharge opening 11 in the upper rear portion of the body to receive concrete flowing out of the opening, regardless of the position to which the distributing chute 32 may be swung on its vertical axis. This desirable feature is depicted in FIGURE 5, which shows the chute in solid lines as extending rearwardly from the body, and in construction lines as swung around to opposite sides of the truck. Note that the semicircular rim portion of the pan is always in position to receive concrete discharging from the chute, both during initial discharge of the body contents, when the body may be tilted only a slight amount out of its transit position such as seen in FIGURE 2, as well as during the later stages of discharge when the body may be tilted a maximum distance as seen in construction lines in FIGURE 3.

The body, of course, is adapted to be tilted in a clockwise direction out of its transit position to effect discharge of its contents, by means of the aforementioned hydraulic cylinders 40. These cylinders are connected between the lower rear corner of the supporting frame or standard 20, and a second yoke 41 on the keel structure, extending transversely beneath the body and joining the keel beams 28 at a location a distance forwardly of the rear yoke 29. Consequently, the two yokes cooperate to produce an exceptionally rigid supporting structure or keel by which the bottom of the body 8 is reinforced, and which protects the body against the thrust of the tilt cylinders 40 when the body is tilted thereby to a discharging position.

As indicated in FIGURE 2, the dump body of this invention may be provided with agitator means 42 generally like those disclosed in my aforesaid Patent No. 2,880,977, comprising a number of paddles 43 on the outer ends of arms 44 radially affixed to a power driven shaft 45 that is supported for rotation in the body on the axis of the conically surfaced bottom wall 10 thereof. The driven forward end of the shaft is supported in a bearing, not shown, in the front wall 16 of the body, and its rear is rotatably supported by a bearing bracket 46 that is suspended from a deck or cover member 47 on the rear portion of the body, bridging the upper edges of the side walls 13 thereof. The paddles are located at different axial and circumferential positions along the length of the agitator shaft, and both the paddles and their supporting arms 44 are tilted out of planes normal to the axis of the shaft so that rotation of the shaft in one direction, counterclockwise, as viewed from the rear in FIGURE 2, effects agitation of concrete in the body and prevents segregation thereof during transit. Rotation of the shaft in the opposite direction causes the concrete in the body to be moved rearwardly and facilitates discharge thereof through the opening 11 in the rear of the body, whenever the usual discharge gate 48 is swung to a raised position about its pivots 49. A hydraulic gate cylinder 50, mounted on the deck or cover 47, is provided to actuate the gate between open and closed positions controlling the discharge of concrete through the real opening 11 in the body.

A highly important feature of this invention, made possible by the outboard bearing structure for the body and the locations of the pivotal supports 34 and 38 for the distributing chute, is that the chute can be tilted downwardly to a steeper angle, of about 45°, than was possible previously. This is not only desirable but essential when the body is used for carrying the dryer mixes of concrete, most often referred to as low slump concrete. Such low slump concrete is generally regarded as that which has a slump of from 1½ inches to 0 inch, and which accordingly has very poor flow characteristics. Consequently, the steeper the angle of inclination for the distributing chute 32, the easier it is for low slump concrete to travel downwardly, unaided, along the chute to the location at which the concrete is to be placed.

In addition, low slump concrete cannot be agitated during transit, and in fact, needs no agitation because it presents little or no segregation problem. Moreover, it is so dry and sticky that blades or paddles such as previously described cannot be employed to move the concrete rearwardly along the narrowing body and out of its relatively small discharge opening 11. In the past, such low slump concrete would invariably become choked up in the confines of the narrower portions of the body near its rear under the deck 47, and so clog the discharge opening 11 that a workman had to shovel the concrete therethrough and onto the receiving pan of the distributing chute from a station alongside the rear of the body.

According to this invention, this tendency for low slump concrete to choke up in the discharge end portion of the body is precluded by providing the agitator shaft 45' of the body with a pair of diametrically opposite continuous blades 59, mounted on and located along the rear portion of the shaft. It is important to note that in this case, the shaft is extended to substantially the rear extremity of the body where it is supported by a bearing bracket 46' located just inside the discharge opening 11 at the rear of the body, above and slightly rearwardly of the lower edge 14 of the discharge opening.

Each of the blades 59 is spiral shaped and has its small end adjacent to the rear of the body. The radial dimensions of the spiral correspond to but are slightly less than those of the conical bottom wall 10 of the body, and each blade preferably extends through at least one full convolution. As seen best in FIGURE 7, the blades are joined to the shaft by radial spokes 60, and the small diameter or rear portions of the spiral blades operate in a zone directly adjacent to the rear extremity of the body, and have inwardly curved extremities 61 that travel in an orbit located a distance rearwardly of the lower edge 14 of the discharge opening 11. Hence, the blades can act upon any low slump concrete that tends to choke up and clog the discharge opening and easily move it through the opening in consequence of rotation of the shaft 45' in a counterclockwise direction as seen from the rear of the body.

The spiral blades need extend forwardly from the discharge opening only to about the front edge of the deck 47 covering the rear end portion of the body. This deck ordinarily extends forwardly about one-quarter of the length of the body, or only sufficient to mount the gate cylinder 50 for it is in the space in the rear of the body beneath the deck that clogging of low slump concrete during discharge is most pronounced.

Forwardly of the spiral blades, paddles 43' like those previously described may be secured to the power shaft 45' by arms 44' that travel edgewise through the concrete, with the least possible resistance, during rotation of the shaft to effect discharge of the body contents. As shown in FIGURE 9, these paddles may have less inclination than those described hereinbefore, so as to require less power to drive the same through low slump concrete in the body.

In the embodiment of the invention seen in FIGURES 7 and 8, the discharge opening 11 has a pronounced undercut, so that the lower edge 14 thereof is not only spaced farther forwardly than the side and upper edges of the opening, but is also spaced farther from the axis of the conically surfaced bottom wall 10 of the body. This increases the effective area of the opening, making it easier for low slump concrete to be moved therethrough by the spiral blading, and also making it possible for the blading to operate in a zone rearwardly of the lower edge of the opening. The tilt axis at the rear of the body, however, is in the same relationship to the lower edge of the discharge opening as in the first described embodiment of the invention.

From the foregoing description, together with the accompanying drawings, it will be readily apparent to those skilled in the art that this invention provides an improved means for mounting a tilting rear discharge body on a dump truck and of achieving better discharge of the body contents, especially when the contents comprises low slump concrete.

What is claimed as my invention is:

1. A truck body of the type which tilts about a fixed transverse axis adjacent to its rear to a discharge position with its forward end elevated so as to provide for discharge of its contents, through a rearwardly facing opening in its upper rear end, to the receiving pan of a distributing chute, said body being characterized by:
   (A) a rounded substantially conically surfaced bottom that slants convergently upwardly and rearwardly to said discharge opening and defines the lower edge thereof;
   (B) opposite side walls joined by said bottom wall and likewise converging rearwardly to said discharge opening to define the side edges thereof;
   (C) reinforcing keel structure fixed on the underside of the body and including
       (1) a rigid yoke embracing the rounded bottom of the body and extending transversely thereacross at a location near to but a distance forwardly from the lower edge of the discharge opening so as to provide a space directly under the rear of the body and behind the yoke in which a portion of the receiving pan of a distributing chute can be received, said yoke having opposite ends which project laterally beyond the adjacent side portions of the body;
   (D) outboard bearings fixed to the opposite ends of the yoke at its rear, so as to be located outwardly of the adjacent side portions of the body and of said pan receiving space, said bearings having pivot engaging means thereon which align on a common transverse axis passing through said space rearwardly of the yoke and directly adjacent to the bottom edge of the discharge opening, to provide for mounting the body for tilting discharge motion;
   (E) and power driven means rotatably mounted in the rear end portion of the body and having discharge blade means at the rear extremity of the body to operate in said discharge opening.

2. Apparatus mounted on the chassis of a truck or the like for dispensing freshly mixed concrete and similar materials, said apparatus comprising:
   (A) a receptacle having
       (1) a front end,
       (2) a rear end,
       (3) a rearwardly facing discharge opening in its upper rear portion, and
       (4) bottom and side wall portions that converge rearwardly toward and define the discharge opening;
   (B) a reinforcing keel structure fixed on the bottom of the receptacle and comprising
       (1) a beam providing a yoke transversely embracing the underside of the receptacle near to but a distance from its rear end and having opposite end portions projecting outwardly beyond its adjacent side wall portions; and
       (2) rigid keel beams joined to the yoke near each end thereof and extending forwardly therefrom;
   (C) a supporting structure on the chassis, by which the receptacle is carried, comprising a pair of upright supporting members fixed to the rear of the chassis and having upper portions rearwardly adjacent to the opposite ends of the yoke and spaced to opposite sides of the receptacle at its rear;
   (D) means tiltably mounting the receptacle on the supporting structure for motion to and from an elevated discharge position about a transverse axis located beneath and closely adjacent to the bottom edge of the discharge opening, so that concrete can flow from the receptacle out of said opening in consequence of tilting of the receptacle to said position, said mounting means comprising
       (1) bearing members on the ends of the yoke, one for each of said supporting members, extending rearwardly from the yoke toward said upper portions of the supporting members, and similarily spaced to opposite sides of the receptacle at its rear,
       (2) cooperating pivot means on each of said bearing members and on said upper portions of the supporting members, comprising a pivot pin for each bearing member, each of said pins being coaxial with and endwise remote from the other so that there is an unobstructed space between the supporting members and under the rear portion of the receptacle behind said yoke; and
   (E) means mounted on the supporting structure for conducting discharging material away from the discharge opening, said last named means having an upper rim portion extending forwardly under the bottom edge of the discharge opening and into the space between said supporting and bearing members so as to be in a favorable position to receive all of the material discharged from the receptacle when the same is tilted to its discharge position.

3. A truck body for concrete and similar materials, and of the type which tilts about a transverse axis adjacent to its rear to a position at which its forward end is elevated to effect rear discharge of its contents, characterized by:
   (A) a rounded substantially conically surfaced bottom wall that slants convergently upwardly and rearwardly;
   (B) opposite side walls joined by said bottom wall and similarly converging rearwardly;
   (C) a rearwardly facing discharge opening in the rear of the body having bottom and side edges defined by said designated walls of the body, the side edges extending upwardly from and rearwardly beyond the bottom edge of the opening;
   (D) a deck on the body providing a top wall covering the rear portion of the body;
   (E) a shaft in the body extending lengthwise thereof to its rear;
   (F) means mounting the shaft for rotation about a fixed axis coincident with that of the conically surfaced bottom wall of the body, including a bearing carried by and depending from the underside of said deck and located a distance rearwardly of the lower edge of the discharge opening;
   (G) and blading carried by the shaft to rotate therewith, said blading extending rearwardly beyond the lower edge of the discharge opening substantially to the rear extremity of the body and being operable to assure discharge of any body contents through said opening in consequence of rotation of the shaft in one direction.

4. In a dump truck for transporting and distributing concrete and like materials, the combination of:
   (A) a body on the rear portion of the truck having
       (1) opposite side walls that converge rearwardly,
       (2) a substantially conically surfaced bottom wall joining said side walls and slanting convergently upwardly to the rear of the body, and
       (3) a rearwardly facing discharge port at the rear of the body, the side and bottom edges of which are defined by the body side and bottom walls, respectively;
   (B) a supporting structure on the rear of the truck having an upright portion adjacent to the rear of the body;

(C) means mounting the body on said upright portion of the supporting structure for tilting discharge motion about a transverse axis that lies closely adjacent to the bottom wall of the body and to the lower edge of its discharge port, without obstructing a space which is directly under the rear portion of the body and which extends entirely thereacross, said mounting means comprising (1) a rigid keel structure fixed to the bottom of the body and having a pair of bearing members projecting rearwardly therefrom to the tilt axis and located outwardly beyond the opposite sides of the rear portion of the body and in non-obstructing relation to said space, and (2) a pair of pivot supports on the supporting structure, one at each side of the rear portion of the body, cooperating with said bearing members to provide outboard bearings all portions of which are located outwardly of the opposite sides of the rear portion of the body and hence wholly outside of said space;

(D) a distributing chute having a receiving pan at one end, said pan having an arcuate rim symmetrically disposed with respect to the longitudinal center of the chute;

(E) and means on said supporting structure mounting the chute on the rear of the truck for side to side swinging motion with its receiving pan uppermost and an arcuate rim portion thereof extending forwardly under the bottom edge of the discharge port and into said unobstructed space beneath the rear portion of the body to lie close to the bottom wall of the body in all operating positions of the chute within its range of side to side swinging motion, said last named means including pivot means to support the chute in an inclined position for said side to side swinging motion about a vertical axis substantially concentric to the arcuate rim of the receiving pan and a distance rearwardly of the discharge port in the rear of the body, the arcuate rim of the receiving pan and the inclination of the chute permitting said side to side swinging motion of the chute without interference from the outboard bearings and limited only by the engagement of side portions of the chute downstream from its receiving pan with said upright portion of the body supporting structure at locations thereof spaced a substantial distance below the body tilt axis.

5. The dump truck of claim 4, wherein said rigid keel structure includes a yoke which transversely embraces and is fixed directly to the underside of the conically surfaced bottom wall at a location near the rear of the body but spaced a distance forwardly of the body tilt axis, the opposite ends of the yoke projecting outwardly beyond the opposite sides of the body at the rear thereof, and said bearing members being fixed to the opposite ends of the yoke and projecting rearwardly therefrom.

References Cited by the Examiner

UNITED STATES PATENTS

| | | | |
|---|---|---|---|
| 2,544,202 | 3/51 | Warner | 298—7 |
| 2,552,850 | 5/51 | Gray | 298—7 |
| 2,601,449 | 6/52 | Nicholson | 298—7 |
| 2,805,053 | 9/57 | Smith | 259—169 |
| 2,880,977 | 4/59 | Maxon | 298—7 |

FOREIGN PATENTS

| | | |
|---|---|---|
| 1,079,159 | 5/54 | France. |
| 715,647 | 1954 | Great Britain. |

MILTON BUCHLER, *Primary Examiner.*

LEO QUACKENBUSH, EUGENE G. BOTZ, *Examiners.*